United States Patent
Yamashita et al.

(10) Patent No.: US 6,529,665 B1
(45) Date of Patent: Mar. 4, 2003

(54) REFRACTIVE INDEX PROFILE TYPE OPTICAL FIBER

(75) Inventors: Tomoyoshi Yamashita, Hiroshima (JP); Haruko Miyauchi, Hiroshima (JP); Yasushi Kawaharada, Hiroshima (JP); Kazuki Nakamura, Hiroshima (JP); Norizi Oishi, Kanagawa (JP)

(73) Assignee: Mitsubishi Rayon Co., Ltd., Tokyo ( * ) Notice: Subject to any disclaimer, the term of this patent is extended or adjusted under 35 U.S.C. 154(b) by 0 days.

(21) Appl. No.: 09/462,498

(22) PCT Filed: Jul. 27, 1998

(86) PCT No.: PCT/JP98/03331
§ 371 (c)(1),
(2), (4) Date: May 22, 2000

(87) PCT Pub. No.: WO99/05548
PCT Pub. Date: Feb. 4, 1999

(30) Foreign Application Priority Data

Jul. 25, 1997 (JP) .............................. 9-200623
Sep. 29, 1997 (JP) .............................. 9-264270

(51) Int. Cl.$^7$ ................................ G02B 6/18
(52) U.S. Cl. ................ 385/124; 385/127; 385/143
(58) Field of Search ................ 385/124, 123, 385/126, 127, 141, 143, 145

(56) References Cited

U.S. PATENT DOCUMENTS

| | | | | |
|---|---|---|---|---|
| 5,911,025 A | * | 6/1999 | Garito et al. | 385/123 |
| 6,002,828 A | * | 12/1999 | Hult et al. | 385/141 |
| 6,185,353 B1 | * | 2/2001 | Yamashita et al. | 385/124 |
| 6,307,992 B2 | * | 10/2001 | Yamashita et al. | 385/124 |

FOREIGN PATENT DOCUMENTS

| | | |
|---|---|---|
| EP | 0 488 390 | 6/1992 |
| EP | 0 497 984 | 8/1992 |
| EP | 0 942 301 | 9/1999 |
| JP | 50-6350 | 1/1975 |
| JP | 60-119509 | 6/1985 |
| JP | 5-232337 | 9/1993 |
| JP | 8-304640 | 11/1996 |
| JP | 8-313734 | 11/1996 |
| JP | 9-133819 | 5/1997 |
| JP | 9-133820 | 5/1997 |
| JP | 9-189813 | 7/1997 |
| WO | WO 97/36196 | 10/1997 |

* cited by examiner

Primary Examiner—Rodney Bovernick
Assistant Examiner—Sung Pak
(74) Attorney, Agent, or Firm—Oblon, Spivak, McClelland, Maier & Neustadt, P.C.

(57) ABSTRACT

Disclosed is a graded index type optical fiber having a multilayer structure comprising a plurality of concentrically arranged non-blended layers LNB1 to LNBm formed of (co)polymers P1 to Pm selected from the group consisting of two or more homopolymers HP1, HP2, ... and HPn composed of units of vinyl monomers M1, M2, ... and Mn, respectively (provided that the refractive indices of the homopolymers decrease in that order), and one or more binary copolymers CPs composed of units of vinyl monomers M1, M2, ... and Mn, each of (co)polymers P1 to Pm having a glass transition temperature (Tg) of 80° C. or above, wherein the refractive index is highest at the center of the multilayer structure and decreases gradually toward the outer periphery thereof. This optical fiber has a small transmission loss, a large numerical aperture, and excellent resistance to moist heat.

31 Claims, 1 Drawing Sheet

REFRACTIVE INDEX PROFILE TYPE OPTICAL FIBER

TECHNICAL FIELD

This invention relates to graded index type plastic optical fibers which can be used as optical communication media.

BACKGROUND ART

Graded index type plastic optical fibers (hereinafter referred to as "GI type POFS") having a radial refractive index distribution in which the refractive index decreases gradually from the center toward the outer periphery of the optical fiber have a wider frequency bandwidth than step index type optical fibers, and are hence expected to be useful as optical communication media.

In the case of GI type POFs, one having a large numerical aperture (NA) and as small a transmission loss as possible needs to be formed for the purpose of improving its bending loss and its coupling loss with the light source. In order to increase NA, GI type POFs must be designed so that the maximum difference in refractive index ($\Delta n_d$) between the center and the outer periphery of the optical fiber is sufficiently large.

Various methods of making such GI type POFs are known. They include, for example, (1) a method which comprises providing two monomers having different reactivity ratios and yielding homopolymers with different refractive indices, placing these monomers in a cylindrical vessel made of a polymer of these monomers so as to cause the polymer to be dissolved and swollen, polymerizing the monomers, and then drawing the resulting product (JP-A 61-130904); (2) a method which comprises preparing a plurality of polymer blends by using two polymer having different refractive indices at various mixing ratios, spinning these polymer blends to form a multilayer fiber, and then heat-treating this fiber to effect interdiffusion between adjacent layers (JP-A 1-265208); and (3) a method which comprises winding films formed of a plurality of binary copolymers having different copolymerization ratios, and drawing the resulting laminate under heated conditions (JP-B 55-15684).

Moreover, in order to minimize a transmission loss caused by exposure to a thermal history, there is known (4) a step index type optical fiber in which a matching layer showing stepwise changes in refractive index is disposed between the core layer and the cladding layer (JP-A 5-232337). Furthermore, there are known step index type optical fibers in which resins having different refractive indices are laminated to create a stepwise refractive index distribution (JP-A 9-133818 and JP-A 9-133819).

The GI type POFs made by the above-described methods (1) and (2) have the disadvantage that, since all layers are formed of polymer blends, a nonuniform structure due to microscopic phase separation tend to be produced in these POFs and these POFs hence show a great light scattering loss. On the other hand, the GI type POFs made by the method (3) and consisting of styrene-methyl methacrylate copolymers or the like have a great light scattering loss, because the difference in refractive index between the copolymers constituting adjacent layers of the multilayer fiber is too large (e.g., 0.02).

In the method (3), a suggestion is also made about POFs made by winding films formed of binary copolymers of vinyl chloride [Tg (the glass transition temperature of its polymer)=77° C.) and vinyl acetate (Tg=27° C.), or films formed of binary copolymers of ethylene (Tg=−23° C.) and vinyl acetate or ethyl methacrylate (Tg=65° C.) or vinyl chloride. However, if it is attempted to form such POFs having a large NA, some layers will have a low glass transition temperature. Consequently, irregularities of the diameter of fiber and the layer structure may be produced during shaping, or irregularities of the layer structure may be produced owing to strains or stresses caused by bending, twisting and other deformation applied during handling after spinning, resulting in an increase in the transmission loss of the POF. Moreover, the POFs will show a marked reduction in resistance to moist heat which is a performance characteristic required from a practical point of view, resulting in an increased transmission loss.

Furthermore, as to the step index type optical fibers in (4), the POF made by using a copolymer of benzyl methacrylate (Tg=54° C.) and methyl methacrylate (Tg=112° C.) as disclosed in JP-A 5-232337 is such that the proportion of the monomers is 10:1 around the center of the POF and the Tg of the copolymer layer is 60° C. or below. For the above-described reasons, the transmission loss of this POF is as great as 680 dB/km and, moreover, this POF has poor practical performance from the viewpoint of resistance to moist heat. Furthermore, the optical fibers disclosed in JP-A 9-133818 and JP-A 9-133819 also have similar problems because in JP-A 9-133818 is used a homopolymer of benzyl methacrylate around the center and in JP-A 9-133819 is used a homopolymer of 2,2,2-trifluoroethyl methacrylate (Tg=75° C.) around the outer periphery.

DISCLOSURE OF THE INVENTION

An object of the present invention is to provide a wide-band width POF having a small transmission loss, a relatively large numerical aperture, and excellent resistance to moist heat.

The above object is accomplished by a graded index type optical fiber having a multilayer structure comprising a plurality of concentrically arranged non-blended layers formed of (co)polymers which have a glass transition temperature (Tg) of 80° C. or above and are selected from the group consisting of two or more homopolymers HP1, HP2, . . . and HPn (in which n is an integer of 2 or greater) composed of units of vinyl monomers M1, M2, . . . and Mn, respectively (provided that the refractive indices of the homopolymers decrease in that order), and one or more binary copolymers CPs composed of units of vinyl monomers M1, M2, . . . and Mn, wherein the refractive index is highest at the center of the multilayer structure and decreases gradually toward the outer periphery thereof.

BRIEF DESCRIPTION OF THE DRAWINGS

FIGS. 1(a) to (c) illustrate a POF in accordance with the present invention, the POF having a five-layer structure comprising three non-blended layers LNBs and two blended layers LBs.

BEST MODE FOR CARRYING OUT THE INVENTION

As preferred embodiments of the present invention, the following two typical embodiments are given.

An optical fiber having a multilayer structure comprising a plurality of concentrically arranged non-blended layers formed of (co)polymers selected from the group consisting of two homopolymers HP1 and HP2 composed of units of vinyl monomers M1 and M2, respectively, and a binary copolymer CP1/2 composed of units of vinyl monomers M1 and M2 (the binary copolymer CP1/2 including a plurality of binary copolymers having different copolymerization ratios and different refractive indices), each pair of adjacent non-blended layers having therebetween a blended layer formed of the (co)polymers constituting the two adjacent non-blended layers.

An optical fiber having a multilayer structure comprising a plurality of concentrically arranged non-blended layers formed of (co)polymers selected from the group consisting of three homopolymers HP1, HP2 and HP3 composed of units of vinyl monomers M1, M2 and M3, respectively, and a binary copolymer CP1/2 composed of units of vinyl monomers M1 and M2, and a binary copolymer CP2/3 composed of units of vinyl monomers M2 and M3 (each of the binary copolymers CP1/2 and CP2/3 including a plurality of binary copolymers having different copolymerization ratios and different refractive indices), each pair of adjacent non-blended layers having therebetween a blended layer formed of the (co)polymers constituting the two adjacent non-blended layers.

In the present invention, HP represents a homopolymer, CP represents a binary copolymer, BP represents a blend of two (co)polymers, LNB represents a non-blended layer formed of a single (co)polymers, and LB represents a blended layer formed of a blend of two (co)polymers.

First of all, in order to facilitate the understanding of the present invention, a description is given of the embodiment in which the number (n) of monomers is 3 (i.e., there are three types of monomeric units). Where the number (n) of monomers is 3, three homopolymers HP1, HP2 and HP3 may be prepared from units of monomers M1, M2 and M3, respectively. Moreover, two series of binary copolymers CPs may be prepared from M1 and M2 units or from M2 and M3 units. It is preferable to select these (co)polymers so that each CP (or HP) has good compatibility with other CP (or HP).

In this embodiment, polymers having higher refractive indices are prepared as a homopolymer HP1 composed of M1 units, copolymers CPs composed of M1 and M2 units at various molar ratios, or polymer blends BPs composed of the homopolymers HP1 and HP2 at various mixing ratios. On the other hand, polymers having lower refractive indices are prepared as a homopolymer HP3 composed of M3 units, copolymers CPs composed of M3 and M2 units at various molar ratios, or polymer blends BPs composed of the homopolymers HP3 and HP2 at various mixing ratios.

Figure 1A:
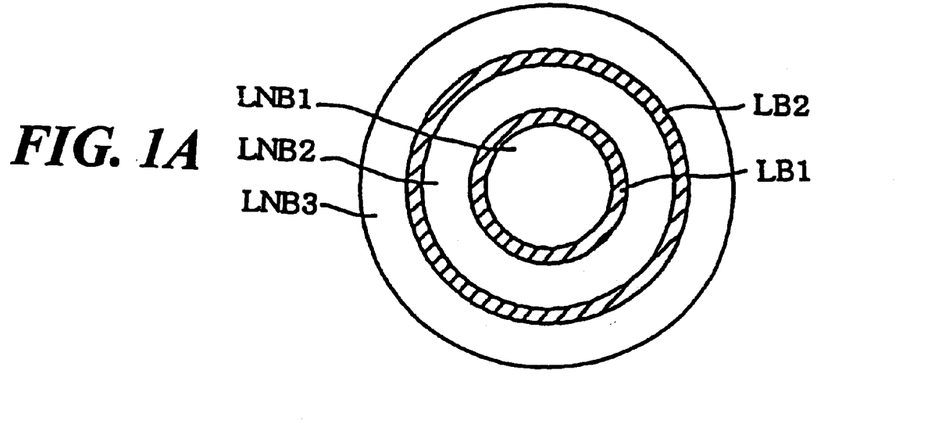
FIG. 1(a) is a cross-sectional view of the POF.
Figure 1B:
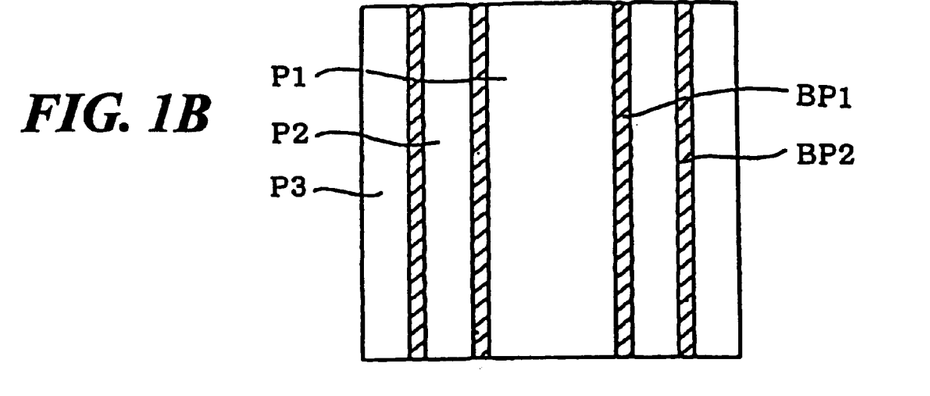
FIG. 1(b) is a longitudinal sectional view thereof.
Figure 1C:
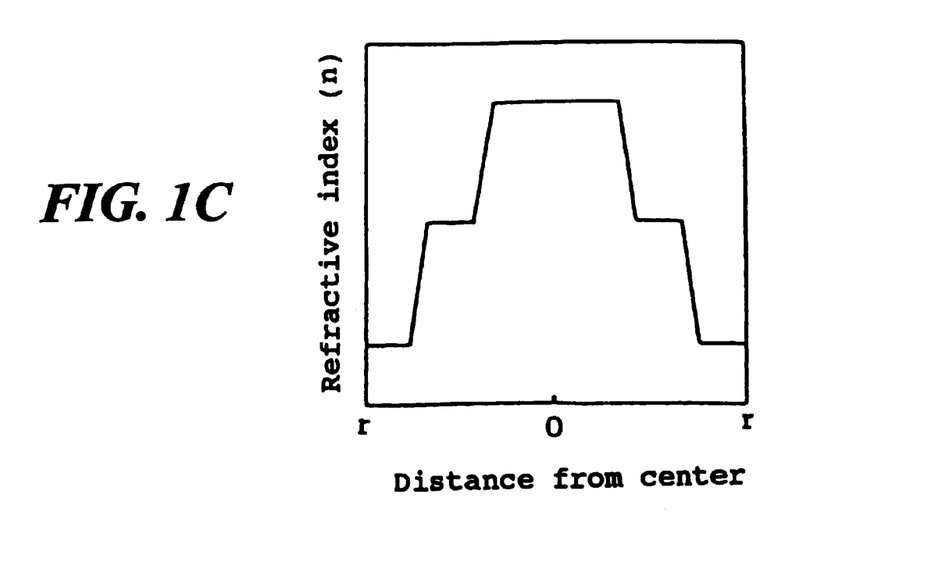
FIG. 1(c) is a graph showing the distribution of refractive indices in a radial direction.

The multilayer structure of a POF in accordance with the present invention is formed of non-blended layers LNBs having desired thicknesses and blended layers LBs having desired thicknesses as illustrated in FIGS. 1(a) to (c), or non-blended layers LNBs alone. In this structure, each non-blended layer LNB is a layer formed of a single (co)polymer, and each blended layer LB is a layer formed of a blend BP of the two (co)polymers constituting the non-blended layers disposed on both sides thereof.

If the number of non-blended layers LNBs is increased, a structure having essentially no blended layer LB may be employed. However, when the number of non-blended layers LNBs is small, it is necessary to form one or more blended layers LBs and, moreover, increase the thickness TB of blended layers LBs so that an abrupt change in refractive index may be avoided.

FIGS. 1(a) to (c) illustrate a POF having a five-layer structure comprising three non-blended layers LNBs and two blended layers LBs. FIG. 1(a) is a cross-sectional view of the POF, FIG. 1(b) is a longitudinal sectional view thereof, and FIG. 1(c) is a graph showing the distribution of refractive indices in a radial direction. As can be seen from FIG. 1(c), the refractive index remains constant in non-blended layers LNBs, while it changes gradually in blended layers LBs. As the total number of layers is increased, the refractive index distribution in the whole POF becomes smoother.

A smoother refractive index distribution is preferable for the purpose of increasing the light transmission bandwidth. However, if the proportion of blended layers LBs in the POF is too high, its light transmission loss will be increased. Accordingly, the profile of the refractive index distribution is chosen with consideration for the balance between the size of the light transmission bandwidth and the magnitude of the light transmission loss.

Moreover, a sheath layer or a jacket layer may be formed on the outer periphery of the GI type POF of FIGS. 1(a) to (c). This sheath layer or jacket layer may have a multilayer structure comprising two or more layers. In order to form the jacket layer, there may be used any well-known materials such as polyethylene, polyvinyl chloride, chlorinated polyethylene, cross-linked polyethylene, polyolefin elastomers, polyurethanes, nylon resins and ethylene-vinyl acetate copolymers.

By considering the multilayer POF of the present invention to be a core part used chiefly as a light transmission path, a sheath layer may be additionally formed on the outer periphery thereof. Also in this case, the sheath layer may have a multilayer structure comprising two or more layers. Any well-known resin may be used for the sheath layer, and the type of resin used may suitably be determined according to characteristics to be imparted to the POF, and the like. In order to reduce the bending loss of the POF, it is preferable that the difference in refractive index between the innermost layer of the sheath layer and the outermost layer of the optical fiber be not less than 0.001. From the viewpoint of refractive index, it is preferable to use, for example, a tetrafluoroethylene-vinylidene fluoride copolymer, an ethylene-chlorotrifluoroethylene copolymer or a polymer which comprises the units of a-fluoroacrylate as the sheath material.

Moreover, in order to improve repeated flexing characteristics, it is preferable to use a tetrafluoroethylene-vinylidene fluoride copolymer, an ethylene-chlorotrifluoroethylene copolymer or the like. In order to improve heat resistance, it is preferable to use a polymer having oxygen barrier properties, such as an ethylene-vinyl alcohol copolymer. In order to impart moisture resistance, it is preferable to use an ethylene-chlorotrifluoroethylene copolymer or the like.

In specific embodiments of the present invention, the material used for the sheath layer may be used for the formation of a jacket layer. Moreover, two or more POFs may be collectively coated with a jacket layer.

Next, the BPs constituting blended layers LBs are explained. Generally, BPs tend to induce fluctuations in refractive index and a structure involving phase separation (hereinafter referred suitably as "a nonuniform structure"), as compared with HPs and CPs. Consequently, the light scattering loss of the whole POF is increased as the proportion of LBs in the POF becomes higher.

Moreover, BPs are generally lower in the thermal stability of the structure than HPs and CPs. Consequently, when the POF is used in a relatively high temperature region for a long period of time, the presence of a high proportion of LBs in the POF promotes the creation of a nonuniform structure and hence causes an increase in light scattering loss.

Thus, since the light scattering loss of the whole POF is increased as the proportion of LBs in the POF becomes higher, it is preferable that the proportion of LBs in the POF be lower and the thickness (TB) of each LB be also smaller. Though TB may vary according to the radial position of LB and may also depend on the desired bandwidth performance and the number of layers generally, TB is preferably in the range of about 0.3 to 100 $\mu$m and more preferably about 1 to 10 $\mu$m.

It is also preferable that the HP and CP, or CP and CP, forming each LB have good compatibility and the difference in refractive index therebetween be sufficiently small.

The (co)polymers constituting the non-blended layers of a GI type POF in accordance with the present invention has a glass transition temperature (Tg) of 80° C. or above. If Tg is unduly low, the whole POF will show a reduction in resistance to moist heat and its transmission loss will hence be increased in a service environment having a relatively high temperature together with moisture. Specifically, since a low-Tg polymer is easily mobile, a new nonuniform structure will be formed owing, for example, to a phase separation in the LBs, resulting in an increased scattering loss. Moreover, since a low-Tg polymer is characterized in that the mobility of low-molecular substances (e.g., water molecules) in the polymer is significantly increased, moisture will easily penetrate into the POF in an moist heat environment. This will cause an increase in molecular vibration absorption loss owing to the presence of water, and an increase in scattering loss owing to the formation of a new nonuniform structure as a result of the interaction between water and residual monomer(s) or residual polymerization aids and the deformation of a fiber.

Accordingly, with consideration for a resistible temperature limit of about 70° C. which is required under postulated common service conditions, it is necessary that the (co)polymers constituting all LNBs of the GI type POF each have a Tg of 80° C. or above, preferably 90° C. or above, more preferably 95° C. or above, and most preferably 100° C. or above.

When monomers yielding homopolymers having a large difference in Tg are used, the Tg of a binary copolymer thereof depends largely on their copolymerization ratio. As to the two types of monomeric units constituting each of the binary copolymers forming LNBS, it is preferable that the homopolymers composed of each type of monomeric units both have a Tg of 80° C. or above. However, granting that the Tg of one homopolymer is lower than 80° C., a binary copolymer composed of both types of monomeric units can have a Tg of 80° C. or above if the content of the aforesaid monomeric units in the binary copolymer is low and the homopolymer composed of the other monomeric units has a sufficiently high Tg.

When a POF in accordance with the present invention is made by using a monomer M1 yielding a homopolymer with a high Tg and a monomer M2 yielding a homopolymer with a low Tg, it is preferable that the difference in refractive index between the homopolymers HP1 and HP2 be sufficiently large. For example, when HP1 has a Tg of about 100° C. and HP2 has a Tg of about 50° C., the content of M2 units in a binary copolymer CP1/2 composed of units of these two monomers must be reduced in order to adjust its Tg to 80° C. or above. Consequently, if the difference in refractive index between HP1 and HP2 is small, it will be difficult to increase the NA of the whole POF.

Now, with respect to the aforesaid binary copolymer, the relationship of the difference in refractive index between HP1 and HP2 to the difference in glass transition temperature therebetween is specifically described below.

A discussion is given of a GI type POF made by using a vinyl monomer M1 capable of yielding HP1 with a glass transition temperature $Tg_1$ and a refractive index $n_1$, and a vinyl monomer M2 capable of yielding HP2 with a glass transition temperature $Tg_2$ and a refractive index $n_2$ (provided that $Tg_1<Tg_2$ and $n_1<n_2$). Then, the glass transition temperature $Tg_{1/2}$ of a copolymer CP1/2 is approximated by the following formula (2), and the refractive index $n_{1/2}$ of a copolymer CP1/2 is approximated by the following formula (3). Moreover, the NA of a POF formed of HP1 and CP1/2 is expressed by the following formula (4).

$$Tg_{1/2}=Tg_1+\Delta Tg \cdot V2 \qquad (2)$$

$$n_{1/2}=n_1+\Delta n \cdot V2 \qquad (3)$$

$$(NA)^2=n_{1/2}{}^2-n_1{}^2 \qquad (4)$$

wherein $\Delta Tg=Tg_2-Tg_1$, $\Delta n=n_2-n_1$, and V2 is the volume fraction of M2 (V1+V2=1).

In formula (1), when a restriction defined by $Tg_{1/2} \geq 80°$ C. is imposed on the glass transition temperature of the copolymer, the relationship between $\Delta n$, $\Delta Tg$ and NA is expressed by the following formula (5).

$$\Delta Tg \geq (80-Tg_1)\cdot\Delta n \div \{-n_1+(n_1{}^2+(NA)^2)^{0.5}\} \qquad (5)$$

When a POF having an NA of 0.3 is designed by using methyl methacrylate (with $n_1=1.492$ and $Tg_1=112°$ C.) as M1 and a material with $n_2=1.442$ (i.e., $\Delta n=0.05$) as M2, it can be seen from formula (4) that $\Delta Tg=-53°$ C. Consequently, it is necessary to use a material (M2) which satisfies the condition defined by $Tg_2 \geq 112-53=59°$ C.

In the case of a GI type POF made by using three monomers M1, M2 and M3, the same discussion is also applicable to CP1/2 and CP2/3.

When three or more monomers are used, it is easier to obtain a large difference in refractive index between the (co)polymer constituting the innermost layer and the (co)polymer constituting the outermost layer, this difference defining the NA of the POF. Consequently, it is preferable to use a larger number of monomers for the formation of the copolymers constituting a POF. However, more labor is required during manufacture as the number of monomers becomes larger. Although the number of monomers used may suitably be determined according to characteristics desired for the POF being made, manufacturing costs, and the like, it is a common practice to use two or three monomers.

Next, the polymers (i.e., HPs and CPs) constituting non-blended layers LNBs are explained. It is preferable that the (co)polymers constituting LNBs in the POF have a small light scattering loss. In order to obtain (co)polymers having a small light scattering loss, it is essentially desirable to select the polymers (or monomers) so that the difference in refractive index between HP1 and HP2 and between HP3 and HP2 is as small as possible. The reason for this is that, if the difference in refractive index between HP1 and HP2 (or between HP3 and HP2) is large, the polymer blend BP of HP1 and HP2 or the copolymer CP composed of M1 and M2 units shows considerable fluctuations in refractive index and hence causes an increase in the light scattering loss of the POF.

However, even in the case of polymers showing a great scattering loss after polymerization owing to a large difference in refractive index between HP1 and HP2 or between HP3 and HP2, it may be possible that, when they are finally kept in a molten state for a predetermined period of time during the formation of a POF, their nonuniform structure disappears in a short period of time (within the melt spinning time) to yield polymers having a small scattering loss.

The time required for the disappearance of the aforesaid nonuniform structure and the level of scattering loss after improvement are thought to depend largely on the compatibility between materials such as HP1/HP2 or HP2/HP3, and the state of the nonuniform structure of the copolymers formed immediately after polymerization.

Where the POF is formed by using two monomers M1 and M2, the difference in refractive index between HP1 and HP2 is preferably not less than 0.05 and more preferably not less than 0.06. Similarly, where the POF is formed by using three monomers M1, M2 and M3, the differences in refractive index between HP1 and HP2 and between HP2 and HP3 are preferably not less than 0.05 and more preferably not less than 0.06.

In optical fibers formed by using two monomers M1 and M2, copolymers meeting these requirements include ones obtained by using a combination of M1 and M2 in which M2 is methyl methacrylate (nd=1.492, Tg=112° C.) and M1 is benzyl methacrylate (nd=1.569, Tg=54° C.), phenoxyethyl methacrylate (nd=1.560, Tg=30° C.), vinyl benzoate (nd=1.579, Tg=75° C.), phenyl methacrylate (nd=1.572, Tg=120° C.), 1-phenylethyl methacrylate, 2-phenylethyl methacrylate (nd=1.559, Tg=30° C.), styrene (nd=1.59, Tg=100° C.) or α-methylstyrene (Tg=102° C.).

Moreover, where fluorinated monomers are used as copolymerization components, they show little absorption due to molecular vibrations and can hence reduce the transmission loss of the POF significantly. Such copolymers include ones obtained by using a combination of M1 and M2 in which M1 is methyl methacrylate and M2 is a fluoroalkyl (meth) acrylate or a fluoroalkyl α-fluoroacrylate. These copolymers have a small scattering loss and are hence preferred.

Examples of the fluoroalkyl (meth)acrylate include 2,2,2-trifluoroethyl methacrylate (Tg=75° C., nd=1.415), 2,2,3,3-tetrafluoropropyl methacrylate (Tg=64° C., nd=1.422), 2,2,3,3,3-pentafluoropropyl methacrylate (Tg=67° C., nd=1.392), 2,2,2-trifluoro-1-trifluoromethylethyl methacrylate (Tg=78° C., nd=1.381), 2,2,3,4,4,4-hexafluorobutyl methacrylate (Tg=49° C., nd=1.402), 2,2,3,3,4,4,5,5-octafluoropentyl methacrylate (Tg=32° C., nd=1.393), 1H,1H,7H-dodecafluoroheptyl methacrylate (Tg=13° C.), 1H,1H,9H-hexadecafluorononyl methacrylate (Tg=−15° C.), 2-(perfluorobutyl)ethyl methacrylate, 2-(perfluorohexyl) ethyl methacrylate and 2-(perfluorooctyl)ethyl methacrylate (nd=1.37).

Examples of the fluoroalkyl α-fluoroacrylate include 2,2,2-trifluoroethyl α-fluoroacrylate (Tg=123C., nd=1.385), 2,2,3,3-tetrafluoropropyl α-fluoroacrylate (Tg=95° C., nd=1.398) and 2,2,3,3,3-pentafluoropropyl α-fluoroacrylate (Tg=110° C., nd=1.366).

Moreover, such copolymers include ones obtained by using a combination of M1 and M2 in which M1 is a fluoroalkyl α-fluoroacrylate, α-fluoroacrylate (Tg=140° C., nd=1.460), pentafluorophenyl methacrylate (Tg=125° C., nd=1.487), pentafluorophenyl α-fluoroacrylate (Tg=160° C., nd=1.465) or pentafluorophenylmethyl methacrylate (Tg=110° C., nd=1.480) and M2 is a fluoroalkyl methacrylate. These copolymers also have a small scattering loss and are hence preferred.

Furthermore, such copolymers include ones obtained by using a combination of M1 and M2 in which M1 is benzyl methacrylate and M2 is α-fluoroacrylate, pentafluorophenyl methacrylate, pentafluorophenyl α-fluoroacrylate or pentafluorophenylmethyl methacrylate. These copolymers also have a small scattering loss and are hence preferred.

In optical fibers formed by using three monomers M1, M2 and M3, copolymers meeting the above-described requirements include ones obtained by using a combination of M1, M2 and M3 in which M1 is phenoxyethyl methacrylate, vinyl benzoate, phenyl methacrylate, benzyl methacrylate, 1-phenylethyl methacrylate, 2-phenylethyl methacrylate, styrene or α-methyl styrene, M2 is methyl methacrylate, and M3 is a fluoroalkyl (meth)acrylate, a fluoroalkyl α-fluoroacrylate, α-fluoroacrylate, pentafluorophenyl α-fluoroacrylate, pentafluorophenyl methacrylate or pentafluorophenylmethyl methacrylate. These copolymers also have a small scattering loss and are hence preferred.

Moreover, such copolymers include ones obtained by using a combination of M1, M2 and M3 in which M1 is benzyl methacrylate, M2 is methyl methacrylate, and M3 is a fluoroalkyl (meth)acrylate, a fluoroalkyl α-fluoroacrylate, α-fluoroacrylate, pentafluorophenyl α-fluoroacrylate, pentafluorophenyl methacrylate or pentafluorophenylmethyl methacrylate. These copolymers also have a small scattering loss and are hence preferred.

According to one preferred embodiment of the present invention, an optical fiber is formed by using three monomers M1, M2 and M3 so as to have a multilayer structure in which M2 is methyl methacrylate and LNBs formed of one or more CP1/2, HP2, and one or more CP2/3 are concentrically arranged in that order. That is, this optical fiber includes a PMMA layer and MMA unit-containing copolymer layers disposed on the inside and outside thereof.

When MMA units acting as a high-Tg component are contained, the (co)polymers constituting various layers may be easily designed to have a high Tg even if the other monomeric units contained in the copolymers have a low Tg. It is preferable that MMA units be contained in an amount of not less than 50% by weight, because the resulting (co)polymers show a further rise in Tg and a further improvement in mechanical strength and resistance to moist heat. It is more preferable that MMA units be contained in an amount of not less than 60% by weight.

Moreover, in a multilayer POF including blended layer LBs, an abrupt change in refractive index at the interfaces between blended layers LBs and non-blended layers LNBs is suppressed as the difference in refractive index between adjacent non-blended layers LNBs becomes smaller, and this reduces the light scattering losses at the interfaces. Accordingly, it is preferable that the difference in refractive index between non-blended layers LNBs be as small as possible. Specifically, the difference in refractive index is preferably not greater than 0.016 and more preferably not greater than 0.008.

It is also preferable that BPs constituting blended layers LBs in the POF have a small light scattering loss. A blend having a small light scattering loss can be obtained by enhancing the mutual compatibility of the (co)polymers being blended.

One preferable means to this end is to select the CPs constituting the adjacent non-blended layers LNBs so that they are composed of the same types of monomeric units but have different copolymerization ratios. In addition, it is more preferable to minimize the difference in copolymerization ratio between these CP (or HP) and CP. In a blend BP composed of (co)polymers between which there is a large difference in copolymerization ratio, the properties of one CP (or HP) are substantially different from those of the other CP. Consequently, their mutual compatibility is reduced and a nonuniform structure tends to be produced in the BP, resulting in an increased light transmission loss of the POF. Actually, the difference in copolymerization ratio is determined at a value which will cause no problem for practical purposes, with consideration for the proportion of blended layers LBs in the whole POF.

The following Table 1 shows isotropic light transmission losses at a wavelength of 650 nm for BPs prepared by selecting two members from among various HPs and CPs having different compositions and blending them at a ratio of 50/50 (wt. %). The aforesaid HPs and CPs were formed from M1 comprising 2,2,2-trifluoroethyl methacrylate (3FM) or 2,2,3,3-tetrafluoropropyl methacrylate (4FM), and M2 comprising 2,2,3,3,3-pentafluoropropyl methacrylate (5FM).

In this table, the (co)polymer formed from M1 and M2 is the homopolymer HP1 of M1 when the content of M2 is 0 mole %, and the homopolymer HP2 of M2 when the content of M1 is 0 mole %. The difference in copolymerization ratio between two copolymers 1 and 2 having different copolymerization ratios is expressed by the difference in the molar content (%) of M1 or M2.

Table 1 indicates that, as the copolymerization ratio of one CP (or HP) is closer to that of the other CP blended therewith, the resulting BP has a smaller isotropic light scattering loss. With respect to M1 or M2, the difference in copolymerization ratio is preferably not greater than 20 mole %, more preferably not greater than 15 mole %, and most preferably not greater than 10 mole %. However, if the difference in copolymerization ratio is extremely small, it may be necessary to increase the number of (co)polymer layers for the purpose of maintaining the desired NA of the optical fiber.

That is, the NA of the whole POF is defined by the value obtained by substituting the refractive index at the outermost layer of the POF for $n_r$. By reducing this NA, light of higher modes (i.e., light having a later arrival time) propagated through the POF is decreased to improve its bandwidth performance. However, if the NA of a POF is reduced, bending of the fiber tends to cause a leak of propagated light out of the fiber and hence an increase in transmission loss (bending loss). Such bending loss characteristics pose a considerably important problem from a practical point of view.

Accordingly, a technique for reducing bending loss while maintaining high bandwidth performance is described below.

A discussion is given of a POF structure formed by disposing a double sheath layer (consisting of a first and a second sheath layer) on the outside of a multilayer POF in accordance with the present invention. Then, NA based on the core and the first sheath layer is determined from the central refractive index $n0$ and the refractive index of the first sheath layer according to formula (1). Assuming that this value of NA is 0.3, NA at the first sheath layer is 0.3. When the second sheath layer is additionally disposed on the outside thereof, NA can similarly be determined from the central refractive index and the refractive index of the second sheath layer according to formula (1). Assuming that this value of NA is 0.5, it can be seen in the same manner as above that NA at the second sheath layer is 0.5.

It is intended in the present invention that a layer formed of a material with a transmission loss of not less than 500 dB/km and having a thickness of 5 to 50 μm be used as the first sheath layer, and a layer having a thickness of 5 to 50 μm but involving no limitation on the transmission loss of its material be used as the second sheath layer.

Excellent features of the POF having the above-described structure are described below.

Apparently, the NA of the whole POF is 0.5. In practice, however, the loss in the first sheath layer is so large that light

TABLE 1

| Monomers M1/M2 | Monomer ratio of copolymer 1 (mole %) | Monomer ratio of copolymer 2 (mole %) | Difference in M1 content between copolymers 1 and 2 (mole %) | Isotropic light scattering loss of mixture of copolymers 1 and 2 (dB/km) |
|---|---|---|---|---|
| 3FM/5FM | 40/60 | 30/70 | 10 | 60–80 |
| 3FM/5FM | 45/55 | 30/70 | 15 | 70–100 |
| 3FM/5FM | 50/50 | 30/70 | 20 | 80–140 |
| 3FM/5FM | 50/50 | 0/100 | 50 | >10000 (cloudy) |
| 3FM/5FM | 50/50 | 100/0 | 50 | >10000 (cloudy) |
| 4FM/5FM | 40/60 | 30/70 | 10 | 60–80 |
| 4FM/5FM | 45/55 | 30/70 | 15 | 80–110 |
| 4FM/5FM | 50/50 | 30/70 | 20 | 90–150 |
| 4FM/5FM | 50/50 | 0/100 | 50 | >10000 (cloudy) |
| 4FM/5FM | 50/50 | 100/0 | 50 | >10000 (cloudy) |

While the embodiment of the present invention in which the number (n) of monomers is 3 has been described above, this description is also applicable to the embodiments of the present invention in which n is 2 or n is 4 or greater.

On the other hand, numerical aperture (NA) is defined by the following formula (1).

$$NA = (n_0{}^2 - n_r{}^2)^{0.5} \quad (1)$$

wherein $n_0$ represents the refractive index at the center of a cross section of the optical fiber and $n_r$ represents the refractive index at a moving radius r from the center.

of higher modes propagated through this layer is attenuated to a considerable extent. Thus, it is possible to obtain a POF which maintains high bandwidth performance corresponding essentially to an NA of 0.3. In this connection, the increase in transmission loss caused by the attenuation of higher modes in the first sheath layer exerts no substantial influence on the transmission loss of the whole POF. The reason for this is that the first sheath layer is very thin and, therefore, its efficiency in use as a transmission path is low. However, if these layers are unduly thin, higher modes will not be sufficiently attenuated and the effective NA will become larger than 0.3, resulting in reduced bandwidth performance.

On the other hand, when the fiber having the above-described structure is locally bent, an appreciable amount of propagated light passes through the thin first sheath layer in the bent area, and reaches the second sheath layer. However, since NA at the second sheath layer is as large as 0.5, some of the aforesaid propagated light having passed through the first sheath layer is totally reflected and returned to the center of the POF, resulting in the occurrence of mode recoupling. This reduces the leakage of propagated light and brings about a marked improvement in bending loss. However, if the first and second sheath layers are unduly thick, the increase in loss caused by these layers will undesirably affect the loss of the POF itself or lessen the effect of improving bending loss characteristics.

NA at the first sheath layer is suitably in the range of 0.2 to 0.35 and preferably 0.25 to 0.3. The thickness of this layer is suitably in the range of 5 to 50 $\mu$m and preferably 10 to 20 $\mu$m. NA at the second sheath layer is suitably in the range of 0.4 to 0.6 and preferably 0.45 to 0.55. The thickness of this layer is suitably in the range of 5 to 50 $\mu$m and preferably 10 to 20 $\mu$m.

While the aforesaid first and second sheath layers have been defined and described separately from the copolymeric multilayer core in accordance with the present invention, it is possible to form the core so as to include layers functioning in the same manner as the first and second sheath layers.

Moreover, the optical fibers of the present invention may be suitably used to construct wide-band width optical fibers for communication use in which their transmission loss at a wavelength of 650 nm is not greater than 250 dB/km, their bandwidth measured at a distance of 50 m is not less than 400 MHz, and the increase in their transmission loss when they are kept in a moist heat atmosphere at 65° C. and 95% RH for 1,000 hours is not greater than 50 dB/km.

While single-core POFs have been described above, POFs having a multicore structure are also contemplated in the present invention. That is, they are multicore optical fibers having a sea-and-island structure in which a plurality of multilayer optical fibers as described above are disposed in a polymer serving as a support.

Since any residual monomer(s) and residual chain-transfer agent present in POFs will deteriorate their resistance to moist heat, it is preferable to minimize these residues as possible. The amount of residual monomer(s) is preferably reduced to 0.5% by weight or less and more preferably 0.2% by weight or less. On the other hand, the amount of residual chain-transfer agent (e.g., n-butyl mercaptan or n-octyl mercaptan) is preferably reduced to 150 ppm or less, more preferably 100 ppm or less, and most preferably 10 ppm or less.

Moreover, the POF of the present invention may be suitably used to construct multicore optical fibers each comprising a plurality of optical fibers disposed in a polymer serving as a support, as well as optical fiber cables each comprising an optical fiber (or multicore optical fiber) having a jacket layer formed on the outside thereof, and optical fiber cables each comprising a plurality of optical fibers (or multicore optical fibers) bundled by a jacket layer. Furthermore, they may be used as plugged optical fiber cables each comprising an optical fiber cable having a plug attached to one or either end thereof.

Although no particular limitation is placed on the method of making the POFs of the present invention, they may be made, for example, according to the following method.

First of all, a reaction mixture is prepared from a monomer mixture for the formation of a copolymer constituting each layer, a polymerization initiator and the like, and subjected to polymerization reaction. Although no particular limitation is placed on the polymerization technique employed, bulk polymerization or the like is preferred. Moreover, a chain-transfer agent is preferably used to control the molecular weight. For this purpose, there may be used any of well-known polymerization initiators and chain-transfer agents.

After the spinning materials so prepared are purified by filtration as required, they are fed to a composite spinning nozzle having a concentric cylindrical structure so that the refractive index decreases toward the outer periphery, and thereby spun in a molten state. Where it is desired to form sheath layers on the fiber, it is preferable to feed the raw materials of the sheath layers to the spinning nozzle at this stage. The spinning temperature is preferably in the range of about 180 to 280° C., and the melt viscosities of the spinning materials are preferably in the range of about 1,000 to 100,000 poises. The number of layers in the POF can be arbitrarily controlled by altering the number of layers in the composite spinning nozzle.

The fiber so extruded may be drawn as required to obtain a POF in accordance with the present invention. The blended layers are formed, for example, by bringing the molten spinning materials constituting adjacent layers into contact with each other within the spinning nozzle. The thickness (TB) of the blended layers is increased as the time of contact of the molten spinning materials becomes longer, and is decreased as the time of contact becomes shorter. The blended layers are also formed by annealing the fiber after excluding. Moreover, the POF thus obtained may suitably be coated with a jacket layer. The jacket layer may be formed according to any well-known method.

The present invention is further illustrated by the following examples.

EXAMPLE 1

(Co)polymers were prepared by using two monomeric components including benzyl methacrylate (BzMA) yielding a homopolymer with a refractive index (nd) of 1.569 and a Tg of 54° C., and methyl methacrylate (MMA) yielding a homopolymer with an nd of 1.492 and a Tg of 112° C. The following five monomer and monomer mixtures (with mixing ratios expressed in mole %) were subjected to polymerization reaction. During polymerization, n-butyl mercaptan [3,000 ppm/monomer(s)] was used as a chain-transfer agent.

1) BzMA/MMA=24/76 [Tg (of the copolymer)=91° C.; MMA content=64% by weight]
2) BzMA/MMA=17/83 (Tg=96° C.)
3) BzMA/MMA=11/89 (Tg=97° C.)
4) BzMA/MMA=5/95 (Tg=102° C.)
5) MMA (Tg=112° C.)

The (co)polymers prepared by these monomer mixtures had a weight-average molecular weight of about 80,000 to 90,000 as measured by GPC.

Subsequently, these five spinning materials were fed to an extruder equipped with a degassing device, and then to a composite spinning nozzle having a five-layer concentric cylindrical structure at 240° C. The monomers and chain-transfer agent remaining in the spinning materials were almost completely removed immediately before the spinning nozzle. The amount of residual monomer(s) present in each (co)polymer immediately before the spinning nozzle was not greater than 0.2% by weight, and the amount of residual chain-transfer agent present therein was not greater than 1 ppm.

Then, these five spinning materials were fed to the extruder, melted at 240° C., and extruded through a composite spinning nozzle having a five-layer concentric cylindrical structure. This spinning nozzle was one designed so that a five-layer concentric cylindrical structure having a diameter of 3 mm is formed at a position 300 mm before the nozzle tip from which a fiber in its molten state is extruded. The nozzle tip temperature (i.e., the spinning temperature) was 230° C. The residence time of the polymers in the spinning nozzle was about 5 minutes. The extruded fiber was drawn so as to give a final diameter of 1 mm, and taken up by means of a wind-up machine.

The POF made in the above-described manner was used at a length of 50 m to measure its −3 dB bandwidth. Thus, it was found to be 870 MHz. This bandwidth measurement was made by using an optical sampling oscilloscope (manufactured by Hamamatsu Photonics Co., Ltd.) and a Semiconductor Laser TOLD 9410 (manufactured by Toshiba Corp.) with an emission wavelength of 650 nm as a light source. Moreover, its transmission loss was measured at a wavelength of 650 nm and a excitation NA of 0.4 according to the 52 m/2 m cut-back method. Thus, its transmission loss was found to be 170 dB/km. The thickness of each blended layer in this POF was about 1 μm to 2 μm.

When a moist heat test was performed under testing conditions including a temperature of 65° C. and a relative humidity (RH) of 95%, the increase in transmission loss after 1,000 hours was as little as 20 dB/km.

EXAMPLE 2

(Co)polymers were prepared by using three monomeric components including benzyl methacrylate (BzMA) yielding a homopolymer with a refractive index (nd) of 1.569 and a Tg of 54° C., methyl methacrylate (MMA) yielding a homopolymer with an nd of 1.492 and a Tg of 112° C., and 2,2,3,3-tetrafluoropropyl methacrylate (4FM) yielding a homopolymer with an nd of 1.422 and a Tg of 64° C. The following four monomer and monomer mixtures were subjected to polymerization reaction.

1) BzMA/MMA=17/83 (Tg=97° C.; MMA content=74% by weight)
2) BzMA/MMA=8/92 (Tg=105° C.)
3) MMA (Tg=112° C.)
4) MMA/4FM=93/7 (Tg=106° C.)

Each of these monomer and monomer mixtures was polymerized. Then, a POF was made by melt-spinning the resulting (co)polymers in the same manner as in Example 1, except that a composite spinning nozzle having a four-layer concentric cylindrical structure was used. The (co)polymers had a weight-average molecular weight of about 80,000 to 90,000. Immediately before the spinning nozzle, the amount of residual monomer(s) present in each (co)polymer was not greater than 0.2% by weight, and the amount of residual chain-transfer agent present therein was not greater than 1 ppm.

The transmission loss of this POF was 155 dB/km, and its bandwidth at 50 m was 720 MHz. The thickness of each blended layer in this POF was about 1 μm to 2 μm, and the increase in transmission loss caused by a moist heat test performed at 65° C. and 95% RH for 1,000 hours was as little as 20 dB/km.

EXAMPLE 3

(Co)polymers were prepared by using two monomeric components including pentafluorophenyl methacrylate (PFMA) yielding a homopolymer with a refractive index (nd) of 1.487 and a Tg of 125° C., and 2,2,3,3-tetrafluoropropyl methacrylate (4FM) yielding a homopolymer with an nd of 1.422 and a Tg of 64° C. The following four monomer and monomer mixtures were subjected to polymerization reaction.

1) PFMA (Tg=125° C.)
2) PFMA/4FM=84/16 (Tg=117° C.)
3) PFMA/4FM=68/32 (Tg=109° C.)
4) PFMA/4FM=54/46 (Tg=101° C.)

Each of these monomer and monomer mixtures was polymerized. Then, a POF was made by melt-spinning the resulting (co)polymers in the same manner as in Example 1, except that a composite spinning nozzle having a four-layer concentric cylindrical structure was used. The (co)polymers had a weight-average molecular weight of about 80,000 to 90,000. Immediately before the spinning nozzle, the amount of residual monomer(s) present in each (co)polymer was not greater than 0.2% by weight, and the amount of residual chain-transfer agent present therein was not greater than 1 ppm.

The transmission loss of this POF was 95 dB/km, and its bandwidth at 50 m was 700 MHz. The thickness of each blended layer in this POF was about 1 μm to 2 μm, and the increase in transmission loss caused by a moist heat test performed at 65° C. and 95% RH for 1,000 hours was as little as 30 dB/km.

EXAMPLE 4

(Co)polymers were prepared by using two monomeric components including methyl methacrylate (MMA) yielding a homopolymer with a refractive index (nd) of 1.492 and a Tg of 112° C., and 2,2,3,3-tetrafluoropropyl methacrylate (4FM) yielding a homopolymer with an nd of 1.422 and a Tg of 64° C. The following four monomer and monomer mixtures were subjected to polymerization reaction.

1) MMA (Tg=112° C.)
2) MMA/4FM=93/7 (Tg=106° C.)
3) MMA/4FM=85/15 (Tg=100° C.)
4) MMA/4FM=76/24 (Tg=94° C.; MMA content=61% by weight)

Each of these monomer and monomer mixtures was polymerized. Then, a POF was made by melt-spinning the resulting (co)polymers in the same manner as in Example 1, except that a composite spinning nozzle having a four-layer concentric cylindrical structure was used. The (co)polymers had a weight-average molecular weight of about 80,000 to 90,000. Immediately before the spinning nozzle, the amount of residual monomer(s) present in each (co)polymer was not greater than 0.2% by weight, and the amount of residual chain-transfer agent present therein was not greater than 1 ppm.

The transmission loss of this POF was 140 dB/km, and its bandwidth at 50 m was 700 MHz. The thickness of each blended layer in this POF was about 1 μm to 2 μm. and the increase in transmission loss caused by a moist heat test performed at 65° C. and 95% RH for 1,000 hours was as little as 25 dB/km.

EXAMPLE 5

(Co)polymers were prepared by using two monomeric components including methyl methacrylate (MMA) yielding a homopolymer with a refractive index (nd) of 1.492 and a Tq of 112° C., and 2,2,2-trifluoroethyl methacrylate (3FM) yielding a homopolymer with an nd of 1.415 and a Tg of 75° C. The following four monomer and monomer mixtures were subjected to polymerization reaction.

1) MMA (Tg=112° C.)
2) MMA/3FM=92/8 (Tg=107° C.)
3) MMA/3FM=83/17 (Tg=102° C.)
4) MMA/3FM=73/27 (Tg=97° C.; MMA content=61% by weight)

Each of these monomer and monomer mixtures was polymerized. Then, a POF was made by melt-spinning the resulting (co)polymers in the same manner as in Example 1, except that a composite spinning nozzle having a four-layer concentric cylindrical structure was used. The (co)polymers had a weight-average molecular weight of about 80,000 to 90,000. Immediately before the spinning nozzle, the amount of residual monomer(s) present in each (co)polymer was not greater than 0.2% by weight, and the amount of residual chain-transfer agent present therein was not greater than 1 ppm.

The transmission loss of this POF was 150 dB/km, and its bandwidth at 50 m was 730 MHz. The thickness of each blended layer in this POF was about 1 µm to 2 µm, and the increase in transmission loss caused by a moist heat test performed at 65° C. and 95% RH for 1,000 hours was as little as 22 dB/km.

EXAMPLE 6

(Co)polymers were prepared by using two monomeric components including methyl methacrylate (MMA) yielding a homopolymer with a refractive index (nd) of 1.492 and a Tg of 112° C., and 2,2,3,3,3-pentafluoropropyl methacrylate (5FM) yielding a homopolymer with an nd of 1.392 and a Tg of 67° C. The following four monomer and monomer mixtures were subjected to polymerization reaction.

1) MMA (Tg=112° C.)
2) MMA/5FM=94/6 (Tg=107° C.)
3) MMA/5FM=87/13 (Tg=102° C.)
4) MMA/5FM=80/20 (Tg=97° C.; MMA content=64% by weight)

Each of these monomer and monomer mixtures was polymerized. Then, a POF was made by melt-spinning the resulting (co)polymers in the same manner as in Example 1, except that a composite spinning nozzle having a four-layer concentric cylindrical structure was used. The (co)polymers had a weight-average molecular weight of about 80,000 to 90,000. Immediately before the spinning nozzle, the amount of residual monomer(s) present in each (co)polymer was not greater than 0.2% by weight, and the amount of residual chain-transfer agent present therein was not greater than 1 ppm.

The transmission loss of this POF was 135 dB/km, and its bandwidth at 50 m was 690 MHz. The thickness of each blended layer in this POF was about 1 µm to 2 µm, and the increase in transmission loss caused by a moist heat test performed at 65° C. and 95% RH for 1,000 hours was as little as 21 dB/km.

EXAMPLE 7

(Co)polymers were prepared by using two monomeric components including benzyl methacrylate (BzMA) yielding a homopolymer with a refractive index (nd) of 1.569 and a Tg of 54° C., and pentafluorophenyl methacrylate (PFMA) yielding a homopolymer with an nd of 1.487 and a Tg of 125° C. The following four monomer and monomer mixtures were subjected to polymerization reaction.

1) BzMA/PFMA=46/54 (Tg=99° C.)
2) BzMA/PFMA=32/68 (Tg=107° C.)
3) BzMA/PFMA=17/83 (Tg=116° C.)
4) PFMA (Tg=125° C.)

Each of these monomer and monomer mixtures was polymerized. Then, a POF was made by melt-spinning the resulting (co)polymers in the same manner as in Example 1, except that a composite spinning nozzle having a four-layer concentric cylindrical structure was used. The (co)polymers had a weight-average molecular weight of about 80,000 to 90,000. Immediately before the spinning nozzle, the amount of residual monomer(s) present in each (co)polymer was not greater than 0.2% by weight, and the amount of residual chain-transfer agent present therein was not greater than 1 ppm.

The transmission loss of this POF was 100 dB/km, and its bandwidth at 50 m was 710 MHz. The thickness of each blended layer in this POF was about 1 µm to 2 µm, and the increase in transmission loss caused by a moist heat test performed at 65° C. and 95% RH for 1,000 hours was as little as 23 dB/km.

EXAMPLE 8

(Co)polymers were prepared by using three monomeric components including benzyl methacrylate (BzMA) yielding a homopolymer with a refractive index (nd) of 1.569 and a Tg of 54° C., methyl methacrylate (MMA) yielding a homopolymer with an nd of 1.492 and a Tg of 112° C., and 2-perfluorooctylethyl methacrylate (17FM) yielding a homopolymer with an nd of 1.373 and a crystalline melting temperature (Tm) of 92° C. The following five monomer and monomer mixtures were subjected to polymerization reaction.

1) BzMA/MMA=17/83 (Tg=97° C.; MMA content=74% by weight)
2) BzMA/MMA=8/92 (Tg=105° C.)
3) MMA (Tg=112° C.)
4) MMA/17FM=98/2 (Tg=100° C.) [for the formation of a first sheath layer]
5) MMA/17FM=91/9 (Tg=73° C.; MMA content =65% by weight) [for the formation of a second sheath layer]

Each of these monomer and monomer mixtures was polymerized. Then, a POF was made by melt-spinning the resulting (co)polymers in the same manner as in Example 1, except that a composite spinning nozzle having a five-layer concentric cylindrical structure was used.

When the transmission loss regarding the MMA/17FM copolymer used for the fourth layer from the center of the POF (i.e., a layer corresponding to an NA of 0.31) was measured, it was 1,000 dB/km. The (co)polymers had a weight-average molecular weight of about 80,000 to 90,000. Immediately before the spinning nozzle, the amount of residual monomer(s) present in each (co)polymer was not greater than 0.2% by weight, and the amount of residual chain-transfer agent present therein was not greater than 1 ppm.

The transmission loss of this POF was 170 dB/km, and its bandwidth at 50 m was 760 MHz. The thickness of each blended layer was about 1 µm to 2 µm, and the increase in transmission loss caused by a moist heat test performed at 65° C. and 95% RH for 1,000 hours was as little as 15 dB/km. The first sheath layer had a thickness of 10 µm and a refractive index of 1.48, and the second sheath layer had a thickness of 10 µm and a refractive index of 1.45.

EXAMPLE 9

(Co)polymers were prepared by using three monomeric components including benzyl methacrylate (BzMA) yielding a homopolymer with a refractive index (nd) of 1.569 and a Tg of 54° C., methyl methacrylate (MMA) yielding a homopolymer with an nd of 1.492 and a Tg of 112° C., and 2,2,2-trifluoroethyl methacrylate (3FM) yielding a homopolymer with an nd of 1.415 and a Tg of 75° C. The following three monomer and monomer mixtures were subjected to polymerization reaction. During polymerization, di-t-butyl peroxide was used as a polymerization initiator, and n-octyl mercaptan [3,000 ppm/monomer(s)] was used as a chain-transfer agent.

1) BzMA/MMA=12/88 (Tg=100° C.; MMA content=80% by weight)
2) MMA (Tg=112° C.)
3) MMA/3FM=86/14(Tg=105° C.; MMA content=80% by weight)

Each of these monomer and monomer mixtures was polymerized. Then, a POF was made by melt-spinning the resulting (co)polymers in the same manner as in Example 1, except that a composite spinning nozzle having a three-layer concentric cylindrical structure was used and the (co)polymers were fed to the spinning nozzle at a temperature of 230° C. The (co)polymers had a weight-average molecular weight of about 80,000 to 90,000. Immediately before the spinning nozzle, the amount of residual monomer(s) present in each (co)polymer was not greater than 0.2% by weight, and the amount of residual chain-transfer agent present therein was not greater than 1 ppm.

The transmission loss of this POF was 127 dB/km, and its bandwidth at 50 m was 442 MHz. The thickness of each blended layer was about 1 $\mu$m to 2 $\mu$m, and the increase in transmission loss caused by a moist heat test performed at 65° C. and 95% RH for 1,000 hours was as little as 20 dB/km.

EXAMPLE 10

A POF was made in the same manner as in Example 9, except that, in addition to the three spinning materials used in Example 9, an ethylene-chlorotrifluoroethylene copolymer serving as a raw material for the formation of a sheath layer was fed to a composite spinning nozzle having a four-layer concentric cylindrical structure. The ethylene-chlorotrifluoroethylene copolymer was fed as a fourth layer. The POF thus obtained showed a further improvement in bending loss characteristics and repeated flexing characteristics over the POF of Example 9.

EXAMPLE 11

(Co)polymers were prepared by using three monomeric components including benzyl methacrylate (BzMA) yielding a homopolymer with a refractive index (nd) of 1.569 and a Tg of 54° C., methyl methacrylate (MMA) yielding a homopolymer with an nd of 1.492 and a Tg of 112° C, and 2,2,2-trifluoroethyl methacrylate (3FM) yielding a homopolymer with an nd of 1.415 and a Tg of 75° C. The following five monomer and monomer mixtures were subjected to polymerization reaction. During polymerization, azobis(2,4,4-trimethylpentane) was used as a polymerization initiator, and n-butyl mercaptan [3,000 ppm/monomer(s)] was used as a chain-transfer agent.

1) BzMA/MMA=12/88 (Tg=100° C.; MMA content=80% by weight)
2) BzMA/MMA=6/94 (Tg=106° C.)
3) MMA (Tg=112° C.)
4) 3FM/MMA=7/93 (Tg=108° C.)
5) 3FM/MMA=14/86 (Tg=105° C; MMA content=80% by weight)

Each of these monomer and monomer mixtures was polymerized. Then, a POF was made by melt-spinning the resulting (co)polymers in the same manner as in Example 1, except that a composite spinning nozzle having a five-layer concentric cylindrical structure was used and the (co)polymers were fed to the spinning nozzle at a temperature of 220° C. The (co)polymers had a weight-average molecular weight of about 80,000 to 90,000. Immediately before the spinning nozzle, the amount of residual monomer(s) present in each (co)polymer was not greater than 0.2% by weight, and the amount of residual chain-transfer agent present therein was not greater than 1 ppm.

The transmission loss of this POF was 135 dB/km, and its bandwidth at 50 m was 853 MHz. The thickness of each blended layer was about 1 $\mu$m to 2 $\mu$m, and the increase in transmission loss caused by a moist heat test performed at 65° C. and 95% RH for 1,000 hours was as little as 20 dB/km.

EXAMPLE 12

A POF was made in the same manner as in Example 11, except that, in addition to the five spinning materials used in Example 11, an ethylene-chlorotrifluoroethylene copolymer serving as a raw material for the formation of a sheath layer was fed to a composite spinning nozzle having a six-layer concentric cylindrical structure. The ethylene-chlorotrifluoroethylene copolymer was fed as a sixth layer. The POF thus obtained showed a further improvement in bending loss characteristics and repeated flexing characteristics over the POF of Example 1.

EXAMPLES 13 and 14

Optical fiber cables having a diameter of 2.2 mm were made by further coating each of the POFs of Examples 10 and 12 with polyethylene. The optical fiber cables thus obtained showed a further improvement in environmental resistance properties such as heat resistance.

EXAMPLE 15

A multicore fiber having a sea-and-island structure was made by using, as the islands, seven POFs having the same multilayer structure as described in Example 1. In this example, MMA constituting the outermost layer in Example 1 was used as the sea material. Accordingly, except for the sea material, the structure of the islands consisted essentially of the part of the fiber of Example 1 extending from its center to the fourth layer. The average diameter of the islands was about 0.5 mm, and the diameter of the whole multicore fiber was 2.0 mm.

The transmission loss of this multicore fiber was 190 dB/km, and its transmission bandwidth per island at 50 m was 0.9 GHz. The thickness of each blended layer in the POFs was about 1 $\mu$m to 3 $\mu$m.

What is claimed is:

1. A graded index type optical fiber having a multilayer structure comprising a plurality of concentrically arranged non-blended layers formed of (co)polymers which have a glass transition temperature (Tg) of 80° C. or above and are selected from the group consisting of two or more homopolymers HP1, HP2, . . . and HPn in which n is an integer of 2 or greater composed of units of vinyl monomers M1 , M2, . . . and Mn, respectively provided that the refractive indices of the homopolymers decrease in that order, and one or more binary copolymers CPs composed of units of vinyl monomers M1, M2, . . . and Mn, wherein the refractive index is highest at the center of the multilayer structure and decreases gradually toward the outer periphery thereof.

2. An optical fiber as claimed in claim 1 wherein the optical fiber has a multilayer structure comprising a plurality of concentrically arranged non-blended layers formed of (co)polymers selected from the group consisting of two homopolymers HP1 and HP2 composed of units of vinyl monomers M1 and M2, respectively, and a binary copolymer CP1/2 composed of units of vinyl monomers M1 and M2 the binary copolymer CP1/2 including a plurality of binary copolymers having different copolymerization ratios and different refractive indices, each pair of adjacent non-blended layers having therebetween a blended layer formed of the (co)polymers constituting the two adjacent non-blended layers.

3. An optical fiber as claimed in claim 1 wherein the optical fiber has a multilayer structure comprising a plurality of concentrically arranged non-blended layers formed of (co)polymers selected from the group consisting of three homopolymers HP1, HP2 and HP3 composed of units of vinyl monomers M1, M2 and M3, respectively, and a binary copolymer CP1/2 composed of units of vinyl monomers M1 and M2, and a binary copolymer CP2/3 composed of units of vinyl monomers M2 and M3 each of the binary copolymers CP1/2 and CP2/3 including a plurality of binary copolymers having different copolymerization ratios and different refractive indices, each pair of adjacent non-blended layers having therebetween a blended layer formed of the (co)polymers constituting the two adjacent non-blended layers.

4. An optical fiber as claimed in claim 2 wherein the difference in refractive index between the homopolymers HP1 and HP2 is not less than 0.05.

5. An optical fiber as claimed in claim 3 wherein the differences in refractive index between the homopolymers HP1, HP2 and HP3 are not less than 0.05.

6. An optical fiber as claimed in claim 2 wherein the monomer M1 is benzyl methacrylate, phenoxyethyl methacrylate, vinyl benzoate, phenyl methacrylate, 1-phenylethyl methacrylate, 2-phenylethylmethacrylate, styrene or α-methylstyrene, and the monomer M2 is methyl methacrylate.

7. An optical fiber as claimed in claim 2 wherein the monomer M1 is methyl methacrylate and the monomer M2 is a fluoroalkyl (meth)acrylate or a fluoroalkyl α-fluoroacrylate.

8. An optical fiber as claimed in claim 2 wherein the monomer M1 is a fluoroalkyl α-fluoroacrylate, α-fluoroacrylate, pentafluorophenylmethyl methacrylate, pentafluorophenyl α-fluoroacrylate or pentafluorophenyl methacrylate, and the monomer M2 is a fluoroalkyl (meth) acrylate.

9. An optical fiber as claimed in claim 2 wherein the monomer M1 is benzyl methacrylate, and the monomer M2 is α-fluoroacrylate, pentafluorophenyl methacrylate, pentafluorophenyl α-fluoroacrylate or pentafluorophenylmethyl methacrylate.

10. An optical fiber as claimed in claim 3 wherein the monomer M1 is phenoxyethyl methacrylate, vinyl benzoate, phenyl methacrylate, benzyl methacrylate, 1-phenylethyl methacrylate, 2-phenylethyl methacrylate, styrene or α-methyl styrene, the monomer M2 is methyl methacrylate, and the monomer M3 is a fluoroalkyl (meth)acrylate, a fluoroalkyl α-fluoroacrylate, α-fluoroacrylate, pentafluorophenyl α-fluoroacrylate, pentafluorophenyl methacrylate or pentafluorophenylmethyl methacrylate.

11. An optical fiber as claimed in claim 3 wherein the monomer M1 is benzyl methacrylate, the monomer M2 is methyl methacrylate, and the monomer M3 is a fluoroalkyl (meth)acrylate, a fluoroalkyl α-fluoroacrylate, α-fluoroacrylate, pentafluorophenyl α-fluoroacrylate, pentafluorophenyl methacrylate or pentafluorophenylmethyl methacrylate.

12. An optical fiber as claimed in claim 3 wherein the monomer M2 is methyl methacrylate and the optical fiber has a multilayer structure comprising non-blended layers formed of the binary copolymer CP1/2, the homopolymer HP2 and the binary copolymer CP2/3 which are concentrically arranged in that order.

13. An optical fiber as claimed in claim 12 wherein the content of the monomer M2 in each of the binary copolymers CP1/2 and CP2/3 is not less than 50% by weight.

14. An optical fiber as claimed in claim 12 wherein the (co)polymer constituting each non-blended layer has a Tg of 95° C. or above.

15. An optical fiber as claimed in claim 1 wherein the difference in refractive index between adjacent non-blended layers is not greater than 0.016, and each pair of adjacent non-blended layers having therebetween a blended layer formed of the (co)polymers constituting the two adjacent non-blended layers.

16. An optical fiber as claimed in claim 1 wherein the difference in copolymerization ratio between two adjacent non-blended layers is not greater than 20 mole %.

17. An optical fiber as claimed in claim 1 wherein the amount of residual monomer(s) present in each (co)polymer is not greater than 0.5% by weight.

18. An optical fiber as claimed in claim 1 wherein the amount of residual chain-transfer agent present in each (co)polymer is not greater than 150 ppm.

19. An optical fiber as claimed in claim 1 which further includes one or more sheath layers formed on the outer periphery thereof.

20. An optical fiber as claimed in claim 19 wherein the (co)polymers constituting the sheath layers are selected from the group consisting of a tetrafluoroethylene-vinylidene fluoride copolymer, an ethylene-chlorotrifluoroethylene copolymer, an ethylene-vinyl alcohol copolymer and a polymer which comprises the units of α-fluoroacrylate.

21. An optical fiber as claimed in claim 19 wherein the sheath layers include a first sheath layer and a second sheath layer formed on the outside thereof, the value of the numerical aperture (NA) of the first sheath layer as defined by the following formula (1) is in the range of 0.2. to 0.35, the first sheath layer is a layer having a thickness of 5 to 50 μm and formed of a material with a transmission loss of not less than 500 dB/km, the value of the numerical aperture (NA) of the second sheath layer as defined by the following formula (1) is in the range of 0.4 to 0.6, and the second sheath layer is a layer having a thickness of 5 to 50 μm $$NA=(n_0^2-n_r^2)^{0.5} \qquad (1)$$

wherein $n_0$ represents the refractive index at the central axis of the optical fiber and $n_r$ represents the refractive index at a moving radius r from the center.

22. A wide-band width optical fiber for communication use comprising an optical fiber as claimed in claim 1 wherein the transmission loss at a wavelength of 650 nm is not greater than 250 dB/km, the bandwidth measured at a distance of 50 m is not less than 400 MHz, and the increase in transmission loss when the optical fiber is kept in a moist heat atmosphere at 65° C. and 95% RH for 1,000 hours is not greater than 50 dB/km.

23. A multicore optical fiber comprising a plurality of optical fibers as claimed in claim 1 which are disposed in a polymer serving as a support.

24. An optical fiber cable comprising an optical fiber as claimed in claim 1 which has a jacket layer formed on the outside thereof.

25. An optical fiber cable comprising a plurality of optical fibers as claimed in claim 1 which are bundled by at jacket layer.

26. An optical fiber cable comprising a multicore optical fiber as claimed in claim 23 which has a jacket layer formed on the outside thereof.

27. An optical fiber cable comprising a plurality of multicore optical fibers as claimed in claim 23 which are bundled by a jacket layer.

28. A plugged optical fiber cable comprising any optical fiber cable as claimed in claim 24 which has a plug attached to at least one end thereof.

29. A plugged optical fiber cable comprising any optical fiber cable as claimed in claim 25 which has a plug attached to at least one end thereof.

30. A plugged optical fiber cable comprising any optical fiber cable as claimed in claim 26 which has a plug attached to at least one end thereof.

31. A plugged optical fiber cable comprising any optical fiber cable as claimed in claim 27 which has a plug attached to at least one end thereof.

* * * * *